Figure 1:
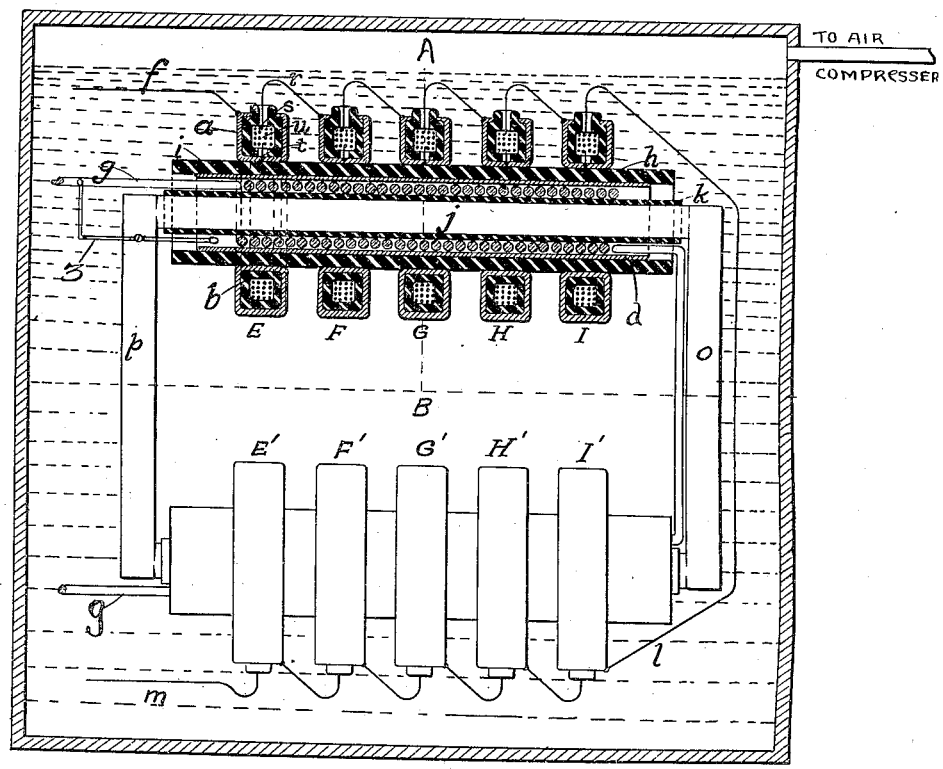

No. 835,367. PATENTED NOV. 6, 1906.
H. J. RYAN.
INSULATION FOR ELECTRIC CIRCUITS AND METHOD OF PRODUCING THE SAME.
APPLICATION FILED SEPT. 24, 1903.

Witnesses,
G. L. Hamilton
A Hamilton

Inventor,
Harris J. Ryan,
per
James Hamilton
Attorney.

UNITED STATES PATENT OFFICE.

HARRIS J. RYAN, OF ITHACA, NEW YORK, ASSIGNOR TO WESTINGHOUSE ELECTRIC & MANUFACTURING COMPANY, A CORPORATION OF PENNSYLVANIA.

INSULATION FOR ELECTRIC CIRCUITS AND METHOD OF PRODUCING THE SAME.

No. 835,367. Specification of Letters Patent. Patented Nov. 6, 1906.

Application filed September 24, 1903. Serial No. 174,441.

*To all whom it may concern:*

Be it known that I, HARRIS J. RYAN, a citizen of the United States, residing at Ithaca, in the county of Tompkins and State of New York, have invented a new and useful Improvement in Insulation for Electric Circuits and Method of Producing the Same, of which the following is a specification, reference being had to the accompanying drawings.

My invention relates to methods for insulating electric circuits and to the product produced by such method or process; and the object of my invention is to provide an insulation which shall have a dielectric strength greater than any heretofore known and free from the defects common to all insulators heretofore known.

In all electrical devices, machinery, or apparatus generating or subjected to high electric pressures, or generating, or carrying and transmitting or consuming electric currents at high electric pressures the conductors thereof must be satisfactorily insulated in the two following essential respects, namely:

(a) The individual conductors where they occur singly, as well as where they occur in groups in the formation of coils, (which latter is the common case,) must be insulated in a manner which is mechanically satisfactory and which electrically has an insulation or dielectric strength ample to withstand the electric pressures that exist between them and the conductors or layers of conductors which lie structurally next to them. Insulations of this class will hereinafter be referred to as "minor" insulations.

(b) Each complete electric circuit of an electric device, be it generator, motor, transformer, or other apparatus, must have an insulation over all of a dielectric strength ample to withstand all working strains due to the sum of the electric pressures generated in or borne by the conductors forming such complete electric circuit, whether consumed therein or transmitted thereby. This insulation will hereinafter be called "major" insulation as distinguished from the minor insulation just described.

In modern practice it has been customary, so far as known to me, in the provision of the major insulation to employ one or the other of the two following methods, namely:

(a) To construct of a flexible solid dielectric the insulator designed to protect the electric circuit as a whole, confining the currents to the conductors thereof. Such insulator when possessing suitable physical properties is adapted to support the conductors and electric circuit which it is designed to protect by its dielectric qualities. However, such an insulator is more or less porous, its pores being filled with some gas, generally air, and, as will be fully explained and pointed out hereinafter, it fails to protect efficiently in its dielectric or insulating function the electric circuit, especially where high electric pressures are involved. Hereinafter such insulators will be referred to as "solid" insulators.

(b) To provide a part of the ultimate requisite dielectric and material make-up of the major insulation by building up the minor insulation of a material necessarily dielectric in whole or in part (according to design) and so constructed as to provide mechanically an ample support for the electric circuit and to complete the major insulation by immersing the electric circuit thus protected electrically and supported mechanically in a suitable dielectric fluid—*e. g.,* a proper petroleum-oil. The function of the fluid dielectric or insulator in this method is twofold, namely: First. It tends to complete the dielectric bulk and strength of the major insulation. Second. It tends to displace to some extent (the degree varies with the manufacturing process employed) the air or other gases caught within the supporting dielectric, and it tends to exclude from the immediate neighborhood of the electric circuit all the air or other gases by displacing them at the time when the electric circuit with its dielectric support is properly immersed in said fluid dielectric. Hereinafter insulators of this type will be called "fluid" insulators.

In modern practice in the construction and operation of the various high-pressure electrical devices it is the common experience to find that the electric pressures to which it is permissible to subject such devices or to apply therein are in the case where fluid insulators are used for the major insulation much higher than in the case where solid insulators are used for the same insulation to protect like circuits, and this experience develops notwithstanding the notable fact that several suitable solid insulators have dielectric strengths many times—i. e., three to five times—greater than the dielectric strength of available fluid dielectrics. The cause for this failure of solid dielectrics to provide major insulations which give practical results equal to those obtained by the use of fluid dielectrics as major insulations is due to the poor dielectric strength of the air or other gases at ordinary densities or at lower densities when confined in small volumes within the solid insulator comprising the major insulation and also when confined between said solid insulator and the conductors forming the electric circuit which it protects in its individual parts and in bulk over the entire exterior. The manner of failure caused by the presence of the air or other gases within and about these solid insulators is as follows: An electrostatic field is established through the dielectric media in which is mounted or immersed a high-pressure electric circuit, and this field is produced by the electric pressure to which said circuit is subjected or which is generated or consumed therein or applied thereto. Such a field may be described as a region permeated by an electrostatic or dielectric flux of molecular electric strain tending to rupture the physical structure of the dielectric media thus encountered. This flux will hereinafter be referred to as "dielectric flux." Between all points of the electric circuit and more or less in proportion to the difference of electric pressure that exists between such points dielectric flux is established through all dielectric media occurring in the region between these points. It results from this that the air or other gases inclosed within or occurring about the solid insulator lies at many points in the same path of dielectric flux as does the solid insulator. Now this air (or other gas) has at all ordinary gaseous densities and at lower gaseous densities much less strength to withstand the strain produced by the dielectric flux than has the solid insulator. The result is that the air (or other gas) ruptures at dielectric flux densities far lower than those which cause the rupture of the solid insulator. Again, when ruptured the air (or other gas) behaves as a conductor of high resistance inserted in the path of the dielectric flux. Thus when the pressure is alternating an electric current is set up through the ruptured gas corresponding to the value of the alternating dielectric flux, which would otherwise be applied to the air or gas at the region of rupture. Owing to the high resistance encountered in gaseous conduction heat is generated that is very destructive to the solid insulator, especially to hydrocarbon insulators, and the heat thus generated is intensely localized, owing to the nature of gaseous conduction, the current flowing in thin streamers which produce intense heat at their termini.

One feature of my invention consists in the method devised by me for greatly increasing the dielectric strength of the air (or other gas) confined within or occurring about the solid insulator, whereby the new insulation so produced is given a higher dielectric strength than that possessed by solid insulators now in common use, and this is the case whether the solid insulator be used alone or as a component part of a fluid insulator, as above fully described.

Briefly set out, this method has for its object to increase the density of the air (or other gas) confined within or about the solid insulator, and thereby so to increase its dielectric strength to withstand the strain produced by the dielectric flux inevitable in the presence of high electric pressures as to cause such dielectric strength to equal or exceed the dielectric strength of the solid insulators now in common use.

One way in which I have contemplated carrying this method out in practice is as follows: The electrical device, apparatus, or machine is mounted in a compartment structurally capable of withstanding an ample pneumatic pressure. Air (or other suitable gas) is then introduced into the compartment under a pneumatic pressure sufficient to cause the density of such air (or gas) to rise to and be maintained at a point by virtue of which all air (or gas) confined within the compartment has attained a dielectric strength ample to withstand without rupture the dielectric flux occasioned by the electric pressure to which the electric circuit thus insulated is subjected or which is applied thereto or generated therein. For example, I estimate that at a pressure of forty atmospheres the dielectric strength of the air should be as great as linseed-oil bond-paper, at eighteen atmospheres it should be as good as that of micanite cloth, and at eight atmospheres it should equal that of melted paraffin or boiled linseed-oil.

Another feature of my invention resides in the method and means which I have devised for increasing the dielectric strength of minor insulations and which remove therefrom all high strain due to dielectric flux. The dielectric flux established about a high-pressure electric circuit must traverse all dielectric media from conductor-surface to conductor-surface between which an electric pressure exists. These media are the major and minor insulations, including therein the medium of immersion, be it gaseous or fluid. Usually on account of structural requirements it often becomes difficult or expensive, or both difficult and expensive, to apply such dielectrics in the construction of the minor insulation as are commonly employed in the construction of the major insulation, yet these minor insulations are often so situated as to be in the path of the dielectric flux at its points of maximum density. For this reason the minor insulation of high-pressure electrical devices often constitutes points of especial weakness in their construction. I have found that the dielectric weakness just described of the minor insulation may be eliminated and the dielectric strength of the minor insulation thereby greatly increased by inclosing in a metallic sheathing (hereinafter called "'guards'") the conductors covered with the minor insulation and usually formed into coils and then connecting conductively these guards to the part of the electric circuit which they envelop. Thus these guards are brought to the same potential as the point of the electric circuit to which they are connected, thereby removing from the minor insulation all high strain due to the dielectric flux, since such high strain now exists between the surface of the guards and the major insulation, including therein the medium of immersion thereof.

To illustrate the method and means by which the minor insulation is relieved in my invention from all high strain due to dielectric flux, I accompany this specification by drawings, in which—

Figure 2:
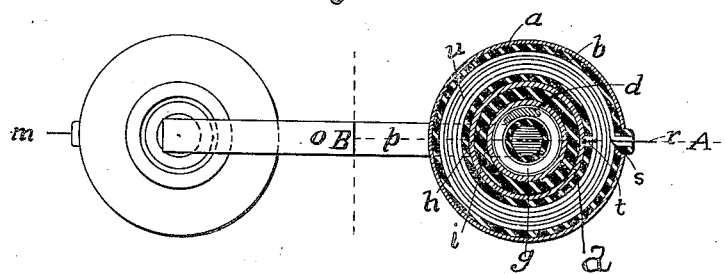

Figure 1 is a side elevation of a transformer, partly in sectional view, on the line A B of Fig. 2; and Fig. 2 is an end elevation of the same, the right-hand portion being a sectional view on the line A B, Fig. 1.

Over the laminated iron core $p\ j\ o$ of the transformer is laid in the usual manner an insulating protective covering $k$, over which is wound the low-pressure circuit $g$. As a guard for the minor low-pressure insulation I mount the metal sheet $d$ and connect it electrically both with the low-pressure circuit and with the core, as at 3. In order to avoid eddy-currents, the guard $d$ is so constructed as not to form a closed circuit about the transformer-core. Over the low-pressure minor insulation-guard $d$ is mounted the major insulation $i\ h$, adapted and designed to afford suitable mechanical support to the high-pressure circuit E F G H I and E' F' G' H' I'. It will be obvious, however, that by varying the design without departing from the substance of my invention the use of the major insulation as a mechanical support for the high-pressure circuit may be greatly modified or even dispensed with. Sections I and I' are connected by wire $l$, and $f$ and $m$ are the lead-wires of the high-pressure circuit. Each section of the high-pressure circuit is inclosed partly or completely, as one desires, with a conductive sheathing $a$, which constitutes the guard for the high-pressure minor insulation, (or minor insulation of the high-pressure circuit,) and each guard $a$ is connected, as at $t$, to one of the terminals of the section of the high-pressure circuit protected by it. The sections of the high-pressure circuit are shown connected in series through the guards $a$; but it is obvious that this particular construction is not essential, for each guard may be left disconnected from all the others so long as it is electrically connected to that part of the high-pressure circuit that constitutes the section over which the guard is mounted. It is specifically the function of this guard to furnish the inevitable charging-current to the major insulation, whether that insulation be gaseous, liquid, or solid, and thus to relieve the electrostatic strain to which the minor insulation would otherwise be subjected. The design of these guards is always such as is best suited to relieve the minor insulation of strains to the desired degree. The transformer as a whole is immersed in compressed air, as previously explained in describing my method of providing the major insulation and increasing the dielectric strength thereof. For example, the transformer may be inclosed in an air-tight compartment and there subjected to a gaseous pressure of many atmospheres, as set out fully above. I have shown such an arrangement in a conventional manner in Fig. 1.

What I claim is—

1. The combination of a transformer; an air-tight compartment within which said transformer is inclosed; a liquid dielectric in which said transformer is immersed; and means for subjecting said liquid dielectric to a pressure of many atmospheres.

2. The combination of a transformer made up of a core, a low-pressure coil and a high-pressure coil, with a conductive guard electrically connected with the high-pressure coil; and insulation between said guard and high-pressure coil, said insulation being subjected to a pressure of several atmospheres.

3. The combination of a transformer made up of a core, a low-pressure coil and a high-pressure coil, with an insulation for said coils; said insulation being subjected to a pressure of many atmospheres, and said low-pressure coil being electrically connected with said core, and with a conductive guard; and said conductive guard.

4. The combination with an air-tight casing and means for forcing air under high pressure into said casing of a liquid dielectric subjected to said pressure in said casing; a transformer immersed therein, the high-pressure coil of said transformer being connected with a conductive guard and the low-pressure coil thereof being connected with a second guard; and said guards.

HARRIS J. RYAN.

Witnesses:
HENRY H. NORRIS,
GEORGE S. MACOMBER.